Figure 1:
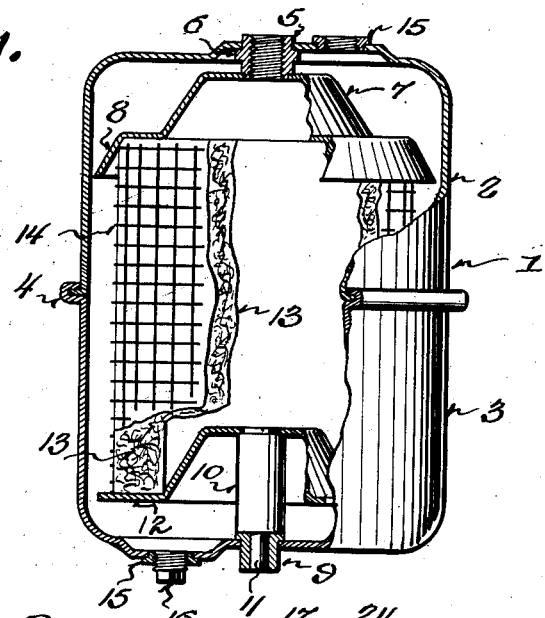

Sept. 17, 1935.                E. J. DEGUENTHER                2,014,800
                                OIL TREATING DEVICE
                                Filed Aug. 14, 1933

Inventor
E. J. Deguenther

Patented Sept. 17, 1935

2,014,800

UNITED STATES PATENT OFFICE 2,014,800

OIL-TREATING DEVICE

Edward J. Deguenther, Milwaukee, Wis.

Application August 14, 1933, Serial No. 685,019

2 Claims. (Cl. 210—165)

This invention pertains to oil-treating devices, and more particularly to an oil filter and magnetic separator for use in connection with internal combustion engines, the oil being circulated through the filter by a suitable pump actuated by the engine.

The invention has primarily for its object to improve such devices by the provision of an exceedingly simple, inexpensive, and efficient filter containing a filtering medium and provided with magnetic means for separating small particles of metal from the oil both before and after the oil passes through the filtering medium, it being appreciated that when pressure is exerted upon the oil, small particles of metal may be forced through the filtering medium.

Incidental to the foregoing, a still further object is to insulate the magnetic means from the casing, thus preventing distribution of the magnetic force over a large surface to maintain sufficient concentrated attraction to completely separate all metallic particles from the oil.

Another object is to provide a casing with filtering and separating means so arranged therein that the filtered oil may be selectively withdrawn from either the top or bottom of the casing.

A still further object is to provide a filter and separator having the foregoing characteristics, and in which the parts are merely fitted together and assembled within a housing sealed against access, thus preventing tampering with the filtering medium and futile attempts to clean the same after it has served its period of usefulness.

With the above and other objects in view, which will appear as the description proceeds, the invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

In the drawing:—

Figure 2:
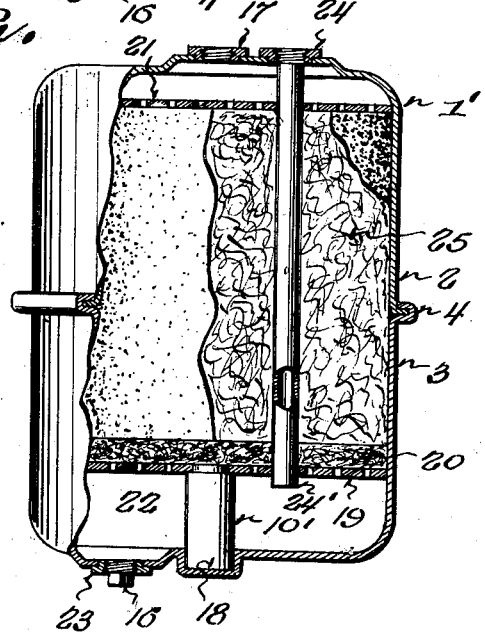

Figure 1 illustrates a filter constructed in accordance with the preferred form of the present invention, parts being broken away and in section to more clearly illustrate the structural features, and Figure 2 is a similar view of a modification of the invention.

Referring now more particularly to the accompanying drawing, and that form of the invention illustrated in Figure 1, the numeral 1 designates a casing formed from upper and lower sections 2 and 3, respectively, which are secured together centrally of the casing by a conventional crimped seam 4, thus securely sealing the casing against access thereto and tampering with the parts assembled therein.

Secured within the top section 2 centrally thereof is a threaded sleeve 5 provided with a flange 6 intermediate its ends which engages the under side of the cover. The lower end of the sleeve 5 is shouldered for reception of a hood 7 provided with a peripheral, tapered flange 8. While the cover, sleeve, and hood may be secured together in any suitable manner, for the purpose of economy in manufacture and assembly, it is proposed to accomplish this by merely pressed fits.

Secured in the bottom of the lower section 3, and projecting therethrough is a flanged sleeve 9, which is preferably formed of brass, or other non-magnetic material, for the purpose to be hereinafter explained. A magnetic bar 10 is provided with a reduced lower end 11, which extends through the sleeve 9 and is exposed at the lower end of the same. Secured to the top of the bar 10, which is shouldered, is a domed, annular plate 12, the peripheral edge of which is spaced slightly from the wall of the casing to permit oil to flow past the same, and at the same time avoid contact between the plate and the casing.

Disposed between the hood 7 and the plate 12 is a cylindrical filtering medium 13 formed from felt, wool, or other suitable material. In order to reenforce the filtering medium, and confine the same against distortion from the oil pressure, a wire meshing 14 may be secured about the same. Obviously the tapered flange 8 of the hood 7, and the dome of the plate 12, serve to centrally aline and retain the filtering medium in position after the parts are assembled.

Both the upper and lower sections are provided with threaded outlets 15, one of which is closed by a plug 16. Thus in operation filtered oil may be selectively withdrawn through either the top or bottom of the casing, which facilitates attachment of the filter to various structures of engines and oil systems.

In operation, oil enters the hood 7 through the sleeve 5 to which the usual tubing is secured. The oil is then forced through the cylindrical filtering medium, which extracts impurities and objectionable material from the same, and during this operation the larger particles of metal, which find their way into the oil from the motor, are extracted by the magnetic attraction of the bar 10 and the supporting plate 12. However, as heretofore explained, some of the smaller particles may be forced through the filtering medium, and as the oil passes under the plate 12 and into contact with the bar 10, these particles are attracted and completely separated, insuring the delivery of pure oil from the filter. As stated, the filtered oil can then be taken from either the upper or lower outlets 15 and delivered to the engine in cleaned condition.

Referring to the modification illustrated in Figure 2 of the drawing, the same comprises a sealed casing 1', similar in construction to the casing 1, and provided in its upper end with an inlet 17 through which oil is supplied to the casing. In this form of the invention a magnetic bar 10' is positioned within a central recess 18 formed in the bottom of the casing, and mounted upon the shouldered upper end of the bar 10' is a perforated supporting plate 19 upon which a filtering pad 20 of felt, or other suitable filtering material, is supported. Loose, flocculent material 25 is then disposed between the pad 20 and a perforated retaining plate 21. Obviously, oil entering the inlet 17 can pass through the perforated retaining plate 21 down through the flocculent material and the pad 20 to the compartment 22 formed below the plate 19. The oil can then be withdrawn through the lower outlet 23, or, if desired to withdraw the same from the top of the casing for convenience in insulation, the upper outlet 24 is opened and oil will pass from the lower compartment 22 through the tube 24' communicating with the outlet 24.

The modified form of invention, while not as efficient as the preferred structure heretofore described, offers a somewhat cheaper construction and can be employed with efficient results for an exceedingly more limited period of time, inasmuch as a more inexpensive filtering medium is employed, and the magnetic attraction is not as concentrated and effective as in the preferred form.

From the foregoing explanation, considered in connection with the accompanying drawing, it will be seen that an exceedingly simple, inexpensive and efficient oil filter and magnetic separator has been devised, in which all of the parts are merely fitted together and assembled in a sealed casing, which prevents tampering or futile attempts to clean the filtering medium. It is well-known that after an oil filter has been in use for a certain period, the same may become so permeated with impurities and foreign matter taken from the oil that it is impossible to properly clean the same. Therefore a new filter should be provided. Some devices make provision for replacement of the filters. However, it has been found that this results in considerable abuse of the devices and futile attempts to clean the filtering medium after the same has served its period of usefulness. The present invention is so cheap in construction that the entire device can be discarded and a new one installed at small expense after the same has become ineffective.

Attention is also directed to the fact that exposure of the magnetic bar 10 through the lower end of the sleeve 9 permits magnetic attraction to be determined at different periods during use of the filter without gaining access to the casing. Also, as stated, the sleeve 9 serves to insulate the magnetic force from the casing, thus confining and rendering the same more effective.

I claim:—

1. A device of the class described, comprising a casing provided with an inlet and an outlet, a filtering medium positioned within said casing between said inlet and outlet, and magnetic means contained in said casing and exposed to oil both before and after passing through said filtering medium to attract particles of metal from the oil.

2. A device of the character described, comprising a casing provided with an outlet and an inlet, a flanged hood carried by the top of the casing, a magnetic bar secured in the bottom of the casing and magnetically insulated therefrom, said bar being exposed exteriorly of the casing, a domed plate mounted on the upper end of said bar, and a cylindrical filtering member mounted on said plate and being retained in spaced relation from the wall of the casing by said dome, said filtering member being engaged and closed at its upper end by said flanged hood, and said outlet being in communication with the exterior of said filtering member.

EDWARD J. DEGUENTHER.